Dec. 17, 1940.  E. A. FITZGERALD  2,225,043

CONTROL METHOD AND DEVICE FOR RADIO SETS AND THE LIKE

Filed June 22, 1936  3 Sheets-Sheet 1

INVENTOR
EDWARD A. FITZGERALD
BY George B. White
ATTORNEY.

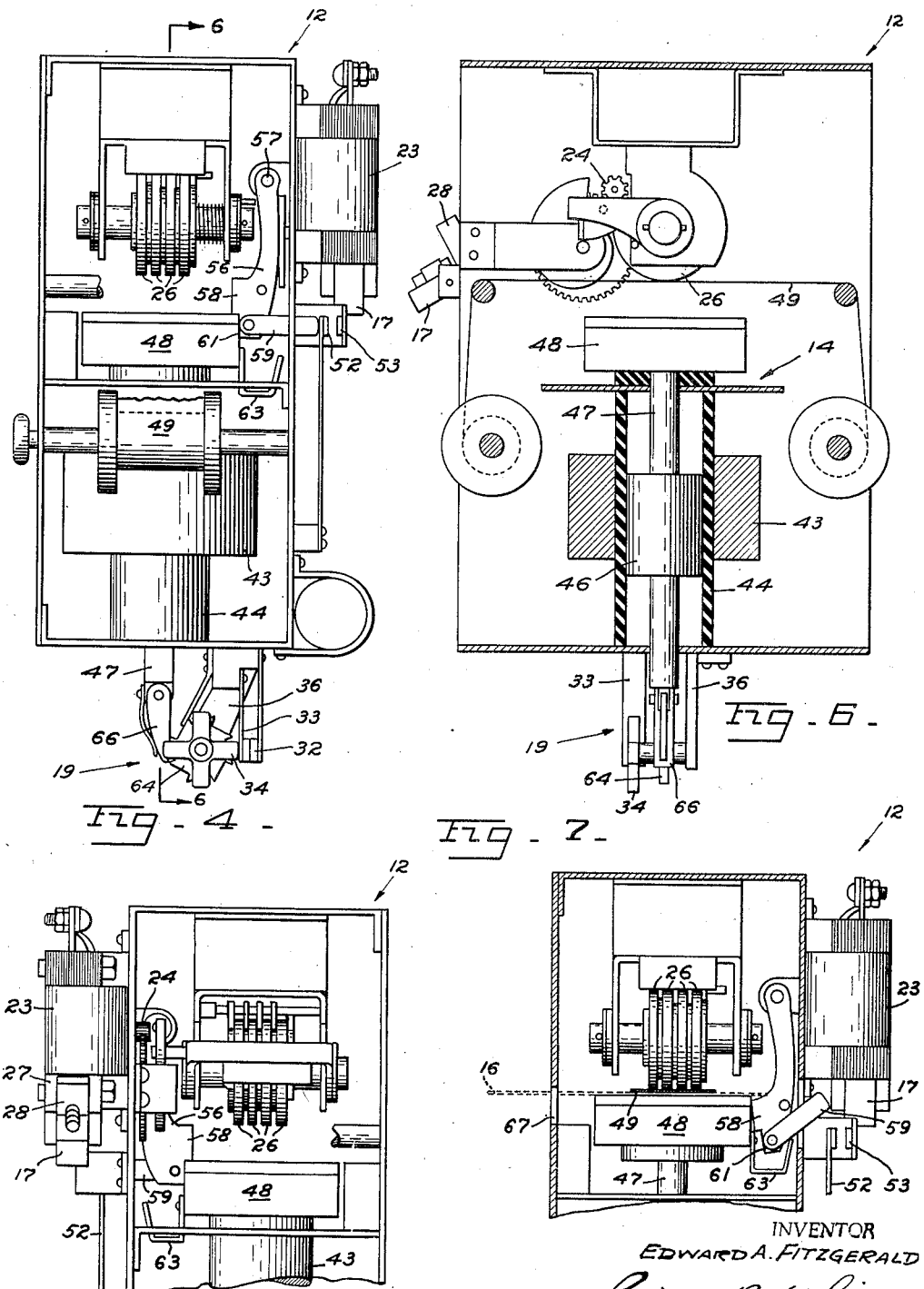

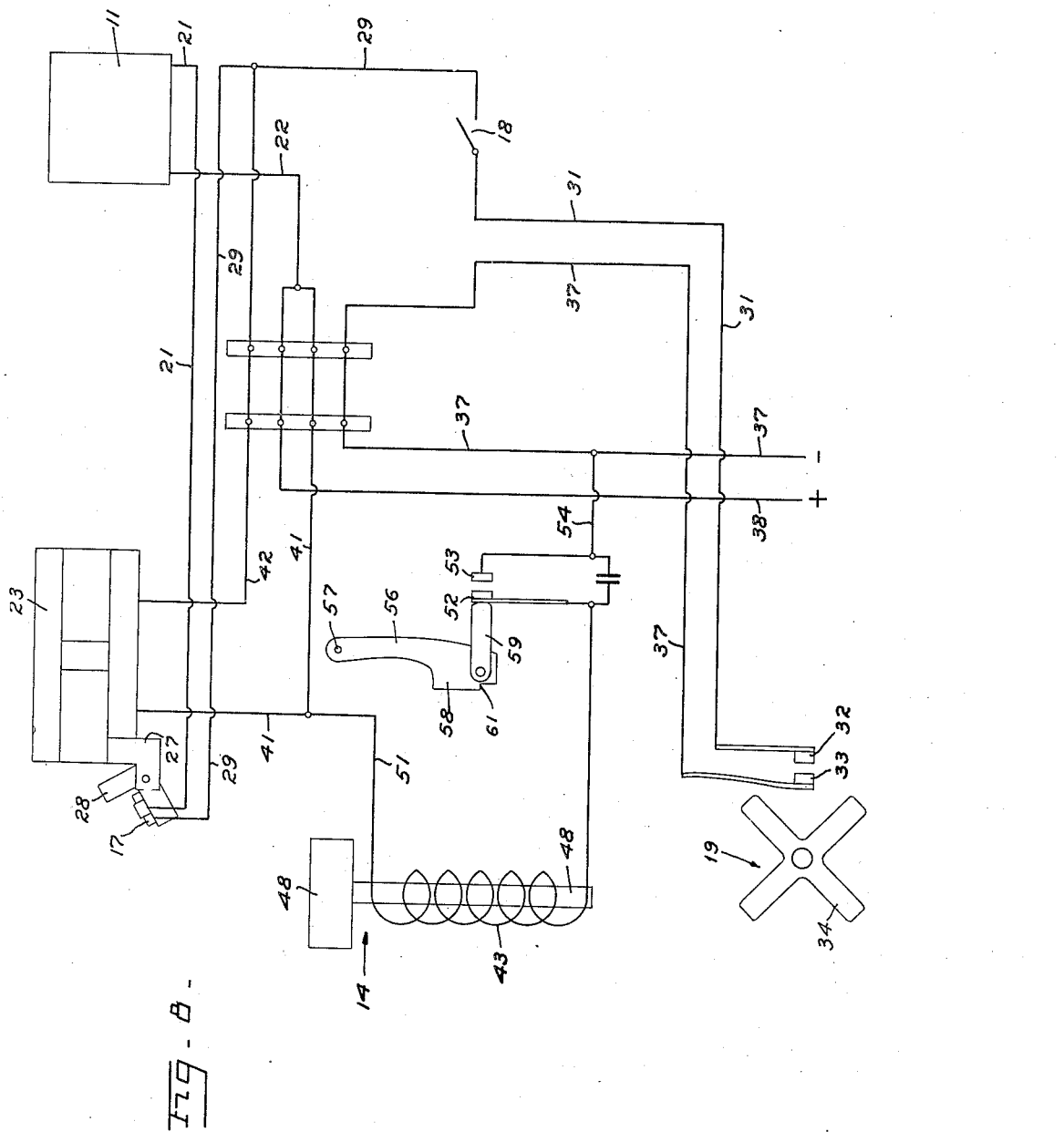

Patented Dec. 17, 1940

2,225,043

UNITED STATES PATENT OFFICE 2,225,043

CONTROL METHOD AND DEVICE FOR RADIO SETS AND THE LIKE

Edward A. Fitzgerald, San Francisco, Calif.

Application June 22, 1936, Serial No. 86,492

4 Claims. (Cl. 234—36.5)

This invention relates to a method and device for controlling and recording the use of radio receiving sets.

An object of the invention is to provide a method whereby the electric circuit of an electrically operated apparatus such as a radio receiving set automatically produces a visible record of the elapsed time of actual use of the apparatus; and wherein the means whereby the record is made is utilized to render the radio receiving circuit operative and inoperative at will.

Another object of the invention is to provide a measuring and recording device for an electrically actuated apparatus wherein the operation of the measuring device and of the apparatus are inter-dependent and can be rendered operative or inoperative by an element whereby the time of actual operation of the apparatus is recorded.

Another object of the invention is to provide a measuring device for radio receiving sets so related to the radio circuit that the radio circuit cannot be used without the simultaneous operation of a time measuring device, means being provided for taking readings from said measuring device and to make or break the respective circuits respectively every time a reading is taken.

Another object of the invention is to provide a time measuring device for a radio receiving apparatus and a card control for the measuring device adapted to render said measuring device and radio circuit operative and inoperative by alternate insertion of the card into the measuring device, means being provided to make a printed or punched record of the readings of the measuring device on predetermined places on the card both at the starting and stopping of the measuring device.

Another object of this invention is to provide a method and device for controlling and recording the use of electric apparatus and particularly radio receiving sets which is highly useful and simple in construction. Convenience of arrangement, lightness and comparative inexpense of manufacture are further objects which have been borne in mind in the production and development of the invention.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description and specifically pointed out in the appended claims, reference is had to the accompanying drawings for the illustrative embodiment of the invention, wherein:

Figure 4 is a side view of my measuring device the ink ribbon being partly broken away.

Figure 5 is a fragmental side view of the measuring device viewed from the side opposite to that of Figure 4.

Figure 6 is a sectional view of my recording and printing device in relation to the measuring mechanism.

Figure 7 is a fragmental cross sectional view of the measuring and printing device in the printing position; and Figure 8 is a wiring diagram of the electric circuit of my device.

Figure 1:
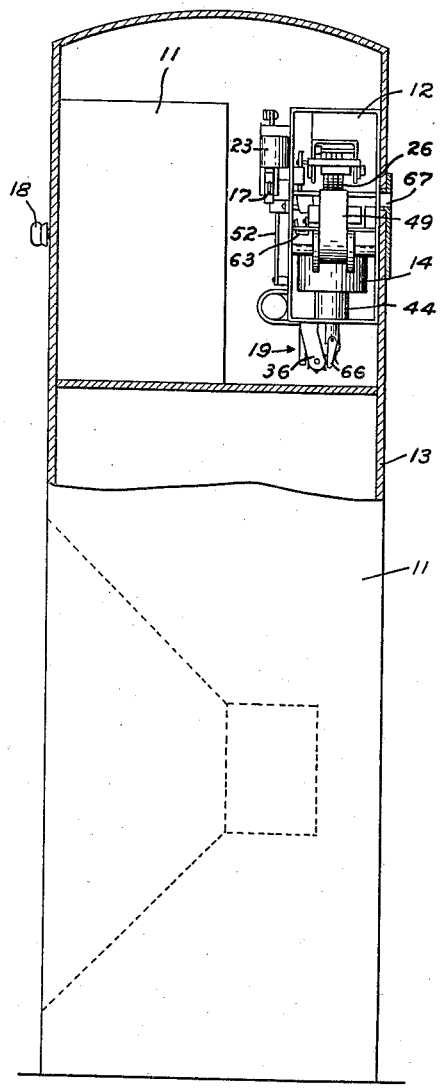
Figure 1 is a side view, partly in section, of a radio receiving apparatus indicating the arrangement of the measuring and reporting device therein.
Figure 2:
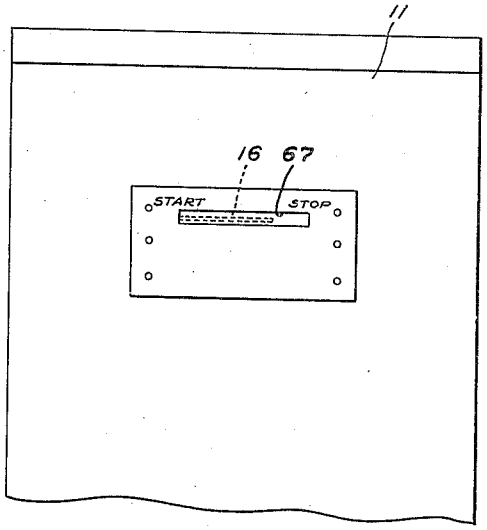
Figure 2 is a fragmental view of a panel of a radio receiving apparatus adjacent the measuring and recording device showing the slot for the insertion of the actuating card.

My method of measuring and indicating the actual elapsed time throughout which an electrically operated apparatus such as a radio receiving set, or a washing machine, or the like, is used consists in the measuring of the elapsed time interdependently with the operation of the apparatus. For instance in the case of a radio receiving set the measuring is at all times interdependent with the electric supply lines of the radio set so that no electric current can flow for the operation of the radio set except during the time measured. When the measuring stops for any reason the supply of electric current to the radio apparatus is also shut off, and vice versa. Then readings of said measurements of time are taken, and the entire interdependent electric circuit is closed or opened respectively at alternate readings. For instance by the first taking of a reading both the measuring and the operation of the apparatus are automatically started, but by the next reading the entire interdependent electric circuit is opened and rendered inoperative. The starting and stopping of the entire electric circuit may be accomplished by the taking of said readings by way of a printed or punched record on a suitable card, so that the entire operation starts and stops at the respective alternate markings of the card.

The method and device herein described has particular practical utility in connection with the renting of electrically operated apparatus especially where the rent is determined by the elapsed time of actual use. While the embodiment herein illustrates the use of this device in connection with radio receiving sets, it is to be understood that the same principle of operation may be applied to the use of other apparatus, such as washing machines and the like.

In carrying out my invention I make use of a radio receiving set 11, of the usual type. In the radio cabinet or casing is an electrical time measuring or timing device 12 mounted on one of the panels or walls, such as the rear panel 13. An electrically actuated stamping device 14 cooperates with the timing device 12 for taking readings off the latter. The stamping device 14 is operable by an object to be stamped or punched or otherwise suitably marked for making a record of the elapsed time during which the radio set 11 is in actual operation. In the herein illustration the stamping device 14 is actuated by and produces a printed record on a card 16. The operation of the radio set 11 and of the measuring or timing device 12 are rendered interdependent by a circuit-breaker 17 which automatically shuts off the supply current of the radio set 11 whenever the timing device 12 is inoperative. A usual button or knob switch 18 is adapted to simultaneously connect or disconnect the supply current to the combined supply circuit of said radio set 11 and said timing device 12.

The aforedescribed entire inter-dependent electric circuit may be controlled by a master switch 19, which latter is opened and closed at respective alternate operations of the stamping device 14. As heretofore stated the stamping device 14 is actuated by the card 16, and the master switch 19 is actuated by the stamping device 14. Therefore the entire operative electric circuit is primarily controlled by the card 16 and particularly by the act of taking a reading on the card 16. At one insertion of the card 16 both the timing device 12 and the radio set 11 are rendered operative, and by the next insertion of the card 16 they are rendered inoperative.

The radio receiving set 11 is of the usual type, although the casing or cabinet of the set may be built to conform to the nature of the installation. The timing device 12 may be mounted in any suitable and accessible position. It is preferable in some instances that in installations in hotel rooms the device be not easily accessible to a guest, yet be readily handled by the employees of the hotel for taking the required readings on the cards 16. The supply lines 21 and 22 of the radio set 11 are connected into the said interdependent circuit.

The timing device 12 includes a synchronous motor 23, which is connected by suitable gearing 24 to suitable rotary counting discs 26 preferably of the printing type so as to count and indicate the time elapsed during which the motor 23 is in operation. The exposed lowermost points of the discs 26 form a printing surface for marking the card 16 when the latter is pressed against it.

Adjacent to an electro-magnetic part 27 of the motor 23, is fulcrumed the circuit-breaker 17, which is of a gravity rockable mercury switch of a usual type. A metal lug 28 of the circuit-breaker 17 is drawn into vertical position by the electro-magnetic part 27 whenever the latter is energized by reason of the operation of the timing device 12. Thus the mercury-container part of the circuit-breaker 17 is brought into horizontal position so as to cause the mercury switch therein to bridge the usual gap between the terminal contacts of the circuit-breaker 17. The radio power supply line 21 is connected to one of the terminals of the circuit-breaker 17, and from the other terminal thereof extends a continuation line or wire 29 to a terminal of the button switch 13. Consequently no power can be conducted to the radio set 11 through wire 21 unless the timing device 12 is operating, nor can the latter be operated without closing the circuit between the lines 21 and 29, thereby the operation of the timing device 12 and of the radio set 11 are rendered fully dependent on each other.

However the closing of the button switch 18 in itself does not always render the timing device 12 and radio set 11 operative, because the other terminal of the button switch 18 is connected by a line 31 to a stationary contact 32 of the master switch 19. A spring contact 33 is normally spaced from the contact 32. A rotary cam or star wheel 34 is mounted on a bracket 36 below the stamping device 14 and opposite the spring contact 33. Whenever the star wheel 34 is turned so that one of its protruding arms engages the contact 33 then the latter is contacted with the contact 32 and the entire circuit is closed. In this position the radio set 11 may be turned on or shut off by the button switch 18, provided the timing device 12 is in operative order. The star wheel 34 has four arms thereon at right angles to each other, so that a one-eighth turn of the star wheel 34 brings an arm out of engagement with the spring contact 33 and allows the latter to spring into circuit breaking position. The next one-eighth turn of the star wheel 34 brings another arm against the contact 33 again closing the circuit.

It is to be noted that a line 37 connects the spring contact 33 to one terminal of a source of electricity, and the line 22 of the radio set 11 completes the circuit through a line 38 to the other terminal of a source of electricity not shown. A line 41 connects the motor 23 to the main supply line 38 in parallel with the line 22, and another line 42 is connected to the line 29 between the circuit breaker 17 and the switch 18 to complete the circuit of the timing device 12.

The printing device 14 includes a solenoid or electro-magnet 43 in which is a guide cylinder 44 preferably of insulating material. In this guide cylinder 44 is reciprocated a core of plunger 46, which falls down by its own weight but is raised by magnetic action whenever the electro-magnet 43 is energized. A shaft 47 extends upwardly from the plunger 46 and on its top is formed a printing platform or platen 48 opposite the printing surface formed by the discs 26 of the timing device 12. A usual ink ribbon 49 extends across between the platen 48 and the discs 25 but closer to the latter. One terminal of the electro-magnet 43 is connected by a line 51 and through the line 41 to the main supply line 38. The other terminal of the electro-magnet 43 is connected to a spring contact 52 of a card actuated circuit-breaker. An opposed stationary contact 53 of said last circuit-breaker is connected by a line 54 to the main supply line 37. Thus when the spring contact 52 is urged into engagement with the other contact 53 then the electro-magnet 43 becomes energized and draws the plunger 44 upwardly. Any object on the plunger 44 is thus pressed against the ink ribbon 49 and against the printing surface of the discs 25 and is marked thereby.

This closing of the stamping circuit is accomplished by the object to be stamped, in the present instance by the card 16. An arm 56 freely depends from a fulcrum 57 along the timing device 12 so as to be swingable toward the spring contact 52. A head 58 of the arm 56 is in the path of movement of the card 16 as the latter is inserted over the platen 48 so that the card 16, when so inserted, pushes the head 58 toward the spring contact 52. A brace link 59 is pivoted on said head 58 and its free end normally engages the spring contact 52. The link 59 urges and holds the spring contact 52 in circuit closing position while the head 58 is pressed away from the platen 48. The head 58 has a cut away recess 61 at its lower corner which fits over the adjacent edge of the platen 48 so as to be normally supported thereon. As the card 16 pushes the head 58 the recess 61 clears the platen 48 so that the head 58 is held in circuit closing position by the side of the platen 48 throughout the upward stroke of the platen 48, as shown in Figure 7. On the platen 48 is a tripping finger 63 aligned with the link 59 and normally spaced from the same to a distance equal to the desired upward power stroke of the platen 48. When the platen 48 is near the end of its upper stroke, and before it reaches the ultimate printing position, the tripping finger 63 trips the link 59 so that the link 59 folds or collapses upwardly around its pivot and relatively to the arm 56. When the link 59 is moved upwardly it clears the spring contact 52 and allows the latter to spring into circuit opening position, as shown in Fig. 7. While the electro-magnet 43 is thus de-energized the platen 48 and the plunger 44 continue upwardly, by their momentum so as to momentarily press the card 16 against the ink ribbon 49 and against the printing surface of the discs 25, and thereby make a marking or imprint on said card 16. Then the platen 48 and plunger 44 drop down into the original position and allow the recess 61 of the head 58 to engage and rest upon the edge of the platen 48. The tripping finger 63 is also disengaged from the link 59 which latter drops down into its initial spacing position, shown in Fig. 4. The card 16 drops on the top of the head 58 and is easily removable.

At every stamping operation of the stamping device 14, as heretofore described, the star wheel 134 of the master circuit-breaker 19 is turned one-eighth of a turn. This is accomplished by means of a ratchet wheel 64 connected to the star wheel 34, and by a spring pawl 66 on the lower end of the plunger 46. On the upward stroke of the plunger 46 the pawl 66 is inoperative, but on its return stroke the pawl 66 engages and turns the ratchet wheel 64 and the star wheel 34 therewith so as to close and open the master circuit-breaker 19 on respective alternate operations of the stamping device 14.

In the wall 13 of the radio set 11 is formed a guide slot 67 which is aligned with the space between the platen 48 and the discs 25 and is opposite the swinging head 58. The card 16 can be easily inserted through the slot 67 and automatically actuate the stamping device 14 and also stop or start the operativeness of the interdependent radio receiving set 11 and timing device 12. The printing discs 25 are at right angles to the slot so as to print on the card parallel with the direction in which the card 16 is moved when inserted.

Figure 3:
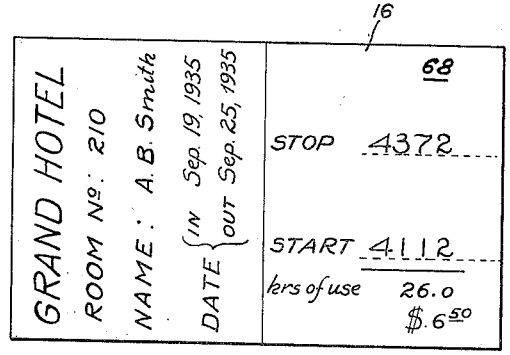
Figure 3 is a plan view of the actuating record card.

The card 16, as shown in Fig. 3, for purposes of illustration, is a so-called master card. Namely it is used by a hotel or hospital, for instance, to check the elapsed time of actual operation of a radio set in a room, during the period that the room was occupied by a guest, or during any stated period. On one half of the face of this card 16 is printed the name of the hotel, the room number, the name of the occupant, and the dates of the first and last reading. On the other half 68 of the same face of the card 16 are spaced marked lines "Stop" on the top, "Start" below it, and "Total hours of use" below the latter. The lines are preferably so arranged that the respective markings are to be stamped on the card on lines parallel with the direction of the insertion of the card into the stamping device. The slot 67 is marked at its opposite edges or ends, respectively "Start" and "Stop." The slot 67 is so related to the printing disc 25 and to the markings on the card 16, that when an edge of the card 16 is at the corner or end of the slot 67 marked "Start," then the second line on the card 16, also marked "Start" is aligned with the discs 25 and when the other edge of the card 16 is at the other corner or end of the slot 67 marked "Stop," then the top line on the card 16, also marked "Stop" is aligned with the discs 25. The first reading should be on the "Start" line, because on the first stamping the radio set 11 becomes operative. The next reading is on the "Stop" line, because the second stamping renders the radio set 11 inoperative. The difference between the numbers indicated by the timing device at such subsequent readings shows the hours and minutes of actual use of the radio set 11 between the two readings, so that the rent or the like data may be readily calculated.

Referring to the wiring diagram shown in Fig. 8 the various electric circuits are described in the following tracing of the circuits. The circuit of the stamping device includes the main line 38 connected through lines 41 and 51 to the electromagnet 43 and to the contact 52. When a card is pushed against the lever 56 then the circuit is continued from the contact 52 to the stationary contact 53 and through line 54 to the other main supply line 37. When the circuit is so closed the electromagnet 43 actuates the plunger of the stamping device as heretofore described so as to turn the master switch 19.

The timing mechanism circuit flows from the main supply line 38 to line 41 and then through the motor 23 to line 42, and then through line 29 and switch 18, when closed, to line 31, and then through contacts 32 and 33, when the master circuit-breaker 19 is closed, to the other main supply line 37.

The circuit of the radio apparatus 11 flows from the main supply line 38 through line 22 to one terminal of the radio apparatus 11, and then through the radio in the usual manner and out through line 21 and mercury switch 17, when closed, to line 29, and then through switch 18, when closed, line 31, contacts 32 and 33, when the circuit breaker 19 is closed to the other main supply line 37.

Having thus described my invention what I claim and desire to secure by Letters Patent is:

1. In a device of the character described, in combination, an apparatus operated by electricity, an electrically operated time measuring mechanism, an impression mechanism whereby readings can be taken from said time measuring mechanism, and means actuated by said impression mechanism to simultaneously render said apparatus and said time measuring mechanism operative and inoperative at alternate readings.

2. The combination with an electrically operated apparatus, an electrically actuated time measuring mechanism therefor, and a stamping device for taking readings from said time measuring mechanism, of a circuit-breaker for controlling the electric current both to said apparatus and to said measuring mechanism, and means responsive to successive operations of said stamping device for alternately opening and closing said circuit-breaker.

3. The combination with an electrically actuated apparatus; of an electrically operated time stamp, a timing mechanism for said time stamp, means actuated by the time stamp to control the electric circuit of said apparatus and of said timing mechanism, and means of connection between the timing mechanism and the apparatus to prevent operation of said apparatus when the timing mechanism is not energized.

4. In a device of the character described, in combination, an apparatus operated by electricity, an electrically operated time measuring mechanism, an impression mechanism whereby readings can be taken from said time measuring mechanism, means actuated by said impression mechanism to simultaneously render said apparatus and said time measuring mechanism operative and inoperative at alternate readings, and means of connection between said apparatus and said time measuring mechanism to prevent the operation of said apparatus when the measuring mechanism is not energized.

EDWARD A. FITZGERALD.